June 5, 1934.	W. M. BACON, JR	1,961,997
RACING LURE ESCAPEMENT
Filed March 23, 1933
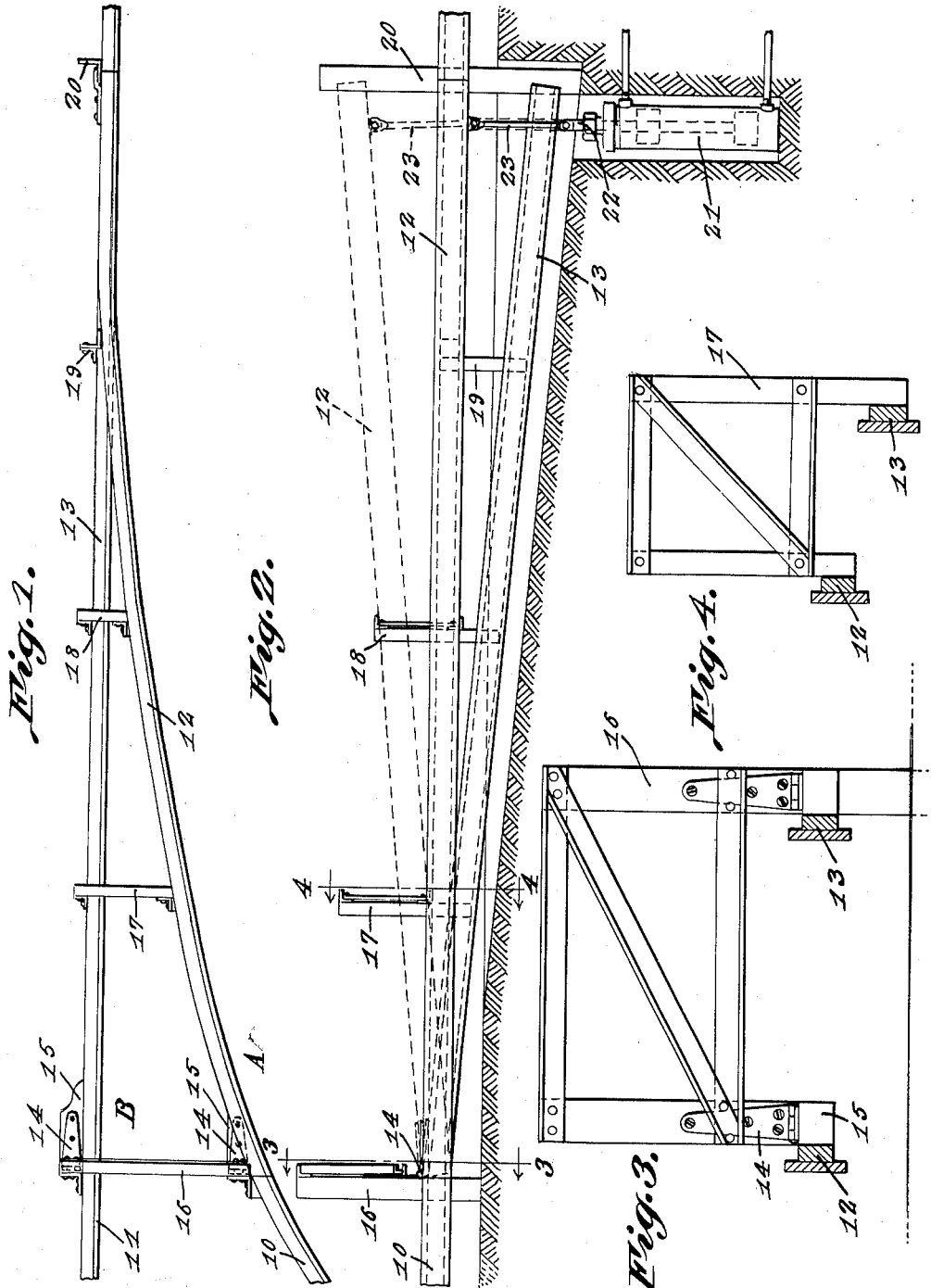
Willard M. Bacon, Jr., INVENTOR
BY Victor J. Evans & Co.
ATTORNEY Patented June 5, 1934

1,961,997

UNITED STATES PATENT OFFICE 1,961,997

RACING LURE ESCAPEMENT

Willard M. Bacon, Jr., Tampa, Fla., assignor to
J. Homer Ellis, Hillsborough County, Fla., and
E. J. O'Hare, Dade County, Fla.

Application March 23, 1933, Serial No. 662,338

1 Claim. (Cl. 104—131)

This invention relates to a racing lure outlet device and more specially to a switch for the escapement of the lure from a dog racing course.

The primary object of the invention is the provision of an equipment of this character, wherein there is arranged in a dog racing course a switch which can be automatically or manually controlled to permit of the escape of a traveling lure so that it is impossible for the racing animals to make a contact therewith because should this lure have a direct attack it is fatal in that it destroys the racing qualities of the animal.

Another object of the invention is the provision of a switch of this character, wherein the arrangement thereof is such to permit of vertical travel so that the main racing course for animals can be opened to an outlet whereby the traveling lure when in the main racing course can be moved through the outlet from the course, thereby assuring the escapement of the lure from the racing animal, the switch being of novel construction and is accurate in its operation and operable with dispatch.

A further object of the invention is the provision of an equipment of this character wherein the necessity for any material alteration in the racing course is eliminated and at the same time there is assured a positive escapement of a lure from the racing course to an outlet, the equipment being so disposed in the course to enable a communication to be established between the racing course and the outlet and this communication is controllable in a unique manner.

A further object of the invention is the provision of an equipment of this character, which is extremely simple in construction, thoroughly reliable and efficacious in its operation, strong, durable, positive in its action and inexpensive to manufacture and install.

With these and other objects in view, the invention consists in the features of construction, combination and arrangement of parts as will be hereinafter more fully described in detail, which disclose the preferred embodiment of the invention, and pointed out in the claim hereunto appended.

In the accompanying drawing:

Figure 1 is a fragmentary plan view of a race course lure track and an outlet showing the switch constructed in accordance with the invention and in normal position for the travel of the lure in the race course.

Figure 2 is a side elevation showing by full lines the normal closed position of the switch and by dotted lines the open position thereof.

Figure 3 is a sectional view on the line 3—3 of Figure 2 looking in the direction of the arrows.

Figure 4 is a sectional view on the line 4—4 of Figure 2 looking in the direction of the arrows.

Similar reference characters indicate corresponding parts throughout the several views in the drawing.

Referring to the drawing in detail, A designates generally a portion of a racing course, more particularly a dog racing field and it is understood that this course may be of any desirable configuration, preferably of the oval formation and B an outlet path for communication with the course for a purpose presently described.

Within the racing course is the permanent track 10 for the travel thereon of the carriage of a racing lure which may be operated in any desirable manner and constitutes no part of the present invention, the carriage and the lure being not shown in the drawing. Related to the permanent track 10 and disposed in the outlet path is the permanent rail 11 of the outlet track. There is a break in the tracks for the racing course and the outlet path at the point or area of communication therebetween to create a gap for a switch constituting the present invention.

The switch comprises the rail sections 12 and 13, respectively, which are coextensive with the break or gap and are disposed at an angle with respect to each other as is clearly shown in Figure 2 of the drawing. The section 12 coacts with the permanent rail 10 of the track in the racing course while the section 13 coacts with the rail 11 in the outlet path to align the straightaway of the track in the racing course with that in the outlet path. These sections 12 and 13 are supported by hinges 14 for vertical swinging movement. The hinges are carried upon suitable bearings 15 permanent with the rails 10 and 11 adjacent to the axis of vertical swinging movement of said sections 12 and 13.

At determined intervals throughout the length of the sections 12 and 13 of the switch are framings 16, 17, 18, 19 and 20, respectively, to give rigidity and unitary organization to the switch as well as to provide a complete clearance when the switch is in position to establish communication between the race course and the outlet so that there will be no interference in the travel of the racing lure from the main racing course into the outlet for its escape from the racing animals on the racing course. The sections 12 and 13 are rigid with the frames 17, 18 and 19 so that these parts move as a unit, as should be apparent, while the frame 16 is made fast to a foundation or the immovable part of a track.

These framings just mentioned can be altered to any desirable extent to arrive at the result named.

Suitably sunken within the foundation of the racing course is an actuator for the switch and in this instance it is in the form of a piston cylinder 21 having operative therein a piston-like jack 22, the stem of which through the medium of a pivotal link 23 has connection with the switch so that on the travel of the jack the switch will be operated. The jack may be operated through the instrumentality of fluid under pressure, although it is to be understood that such jack by a suitable construction thereof can be otherwise automatically or manually controlled.

It is to be understood that while a detail description of an operative structure for accomplishing the purposes of the invention is had there can be changes, variations and modifications as come within the scope of the appended claim and such changes are contemplated. It is understood that in dog racing there is employed a traveling lure and this lure follows the path of the racing course, it being susceptible to power for different speeds of travel and it is important that such lure at certain intervals be let out from the course. By the provision of the switch between the outlet and the racing course this lure can be caused to escape from the course to relieve an attack thereon by the racing animals.

The construction of the switch and the working thereof should be obvious from the foregoing detailed description and, therefore, a more extended explanation has been omitted.

Having described the invention, I claim:

In an equipment of the character described, a main track, an outlet track therefrom and spaced from said main track, a switch occupying the space between the main and outlet tracks and including a rail for the main track and a rail for the outlet track, said rails being arranged at an angle to each other, a plurality of frames vertically arranged at spaced intervals along said rails, united therewith for bracing the same and providing clearance at the switch when open, a stationary frame located at the meeting points of said rails with the main and outlet tracks, hinges connecting the rails with said stationary frame for vertical swinging of such rails, and means beneath the plane of said main and outlet tracks and connected with the rails of said switch and operable to bring either rail aligned with said tracks when the switch is opened or closed.

WILLARD M. BACON, JR.